(12) United States Patent
Lajoie

(10) Patent No.: US 7,247,815 B2
(45) Date of Patent: Jul. 24, 2007

(54) CONTACT TIP INSTALLATION TOOL FOR A WELDING DEVICE

(76) Inventor: Robert Lajoie, 2715 Randolph, Windsor, Ontario (CA) N9E 3E1

( * ) Notice: Subject to any disclaimer, the term of this patent is extended or adjusted under 35 U.S.C. 154(b) by 106 days.

(21) Appl. No.: 10/929,341

(22) Filed: Aug. 27, 2004

(65) Prior Publication Data

US 2005/0082268 A1 Apr. 21, 2005

Related U.S. Application Data

(60) Provisional application No. 60/499,272, filed on Aug. 29, 2003.

(51) Int. Cl.
*B23K 9/32* (2006.01)
*B25B 13/00* (2006.01)

(52) U.S. Cl. .......................... 219/136; 81/52

(58) Field of Classification Search ........... 219/137.52, 219/137.31, 137.61, 136; 81/52, 467, 47
See application file for complete search history.

(56) References Cited

U.S. PATENT DOCUMENTS

| | | | | |
|---|---|---|---|---|
| 2,351,232 A | * | 6/1944 | Schnabolk | 81/114 |
| 3,740,814 A | * | 6/1973 | Marshall | 29/264 |
| 3,972,252 A | | 8/1976 | Hunter | |
| 4,403,530 A | * | 9/1983 | Biddle | 81/478 |
| 4,807,499 A | | 2/1989 | Martinez | |
| 6,075,227 A | | 6/2000 | Lajoie | |
| 6,307,179 B1 | | 10/2001 | Walters, III | |
| 6,729,208 B1 | * | 5/2004 | Chrzanowski | 81/53.2 |
| 6,807,885 B2 | * | 10/2004 | Loper | 81/478 |
| 2001/0035079 A1 | | 11/2001 | Kesinger et al. | |

FOREIGN PATENT DOCUMENTS

| | | | |
|---|---|---|---|
| JP | 07286960 | * | 4/1994 |
| JP | 7-284960 | | 10/1995 |
| JP | 11282685 | * | 10/1999 |
| JP | 11-347731 | | 12/1999 |
| JP | 11347731 | * | 12/1999 |
| JP | 2001-105134 | | 4/2001 |
| WO | WO 87/00788 | | 2/1987 |
| WO | WO 97/17902 | | 5/1997 |

OTHER PUBLICATIONS

International Search Report for International Application No. PCT/CA2004/001574, mailed Jan. 14, 2005.

* cited by examiner

*Primary Examiner*—Kevin Kerns
*Assistant Examiner*—Michael Aboagye
(74) *Attorney, Agent, or Firm*—Proskauer Rose LLP

(57) ABSTRACT

A method and apparatus for manipulating a contact tip of a welding device includes a member, e.g., a clutch bearing or other device, that securely grasps the contact tip and minimizes damage thereto. The method and apparatus can be used to install or remove a contact tip into/from a welding device, e.g., without the need to remove the nozzle of the welding device.

19 Claims, 5 Drawing Sheets

CONTACT TIP INSTALLATION TOOL FOR A WELDING DEVICE

CROSS-REFERENCE TO RELATED APPLICATION

This application claims the benefits of and priority to U.S. Provisional Patent Application Ser. No. 60/499,272 filed on Aug. 29, 2003, which is owned by the assignee of the instant application and the disclosure of which is incorporated herein by reference in its entirety.

FIELD OF THE INVENTION

The invention relates generally to welding devices, and more particularly to tools for the removal and/or installation of contact tips into or from guns used in welding applications.

BACKGROUND OF THE INVENTION

Welding equipment, e.g., metal inert gas (MIG) or Gas Metal Arc Welding (GMAW) welding equipment, can be used for welding one metal workpiece to another metal workpiece. A welding gun can be designed to allow a user or robot to direct a metal welding wire toward a specific location on a target metal workpiece. The components of a typical welding gun include a handle, a gooseneck, a retaining head, a contact tip, and a nozzle. The welding wire is fed through the welding gun, and ultimately through a passageway in the contact tip, which is disposed at an end of the welding gun. The welding wire, when energized for welding, carries a high electrical potential. When the welding wire makes contact with the target metal workpiece an electrical circuit is completed and current flows through the welding wire, across the metal workpiece and to ground. The current causes the welding wire and the metal of the workpieces in contact with the welding wire to melt, allowing workpieces to be joined.

Extreme heat is caused by the resulting current flow. Since the contact tip usually includes copper or a copper alloy, the extreme heat tends to cause it to wear out relatively quickly. In addition, connection between welding gun components can loosen during use, and loose connections can be a source of electrical resistance and in turn generate excessive heat within a welding gun. Heat in welding guns translates into shorter consumable life, tip burn back, and even melting of components.

The proper installation of a contact tip in a welding device is important for maintaining consistency and efficiency in the welding process. Currently, weld operators use a wide variety of tools to remove and replace contact tips, such as pliers or clamping tools. These tools can prevent the weld operator from consistently changing a tip, which can reduce the efficiency of the welding process. Furthermore, these tools can damage the contact tip, thereby inhibiting its performance and creating more down time by increasing the frequency of contact tip changes. In addition, score marks on a contact tip resulting from a clamping device can provide a place for spatter to adhere and for heat to build up, requiring additional tip changes and down time.

Therefore, a need exists in the art for a means of installing a contact tip that minimizes damage to the tip and increases the consistency of the installation, extending the usable lifetime of the contact tip and minimizing down time due to frequent contact tip changes.

SUMMARY OF THE INVENTION

The invention, in various embodiments, features a method and apparatus for manipulating a contact tip of a welding device. The apparatus can include, for example, a clutch bearing that can securely grasp the contact tip, while minimizing damage thereto, which reduces the likelihood of weld spatter adhering to the contact tip or heat building up in a damaged portion of the contact tip. Using the apparatus, a contact tip can be installed or removed from a welding device. In a detailed embodiment, the apparatus can be adapted to remove and replace a contact tip without the need to remove the nozzle of the welding device. In addition, the apparatus can allow for the contact tip to be installed with sufficient force (e.g., a tightening force or torquing force) to ensure secure installation in the welding device.

In one aspect, the invention features an apparatus for manipulating a contact tip of a welding device. The apparatus includes a main body including a first end and a second end defining an elongated portion therebetween, and at least the first end defines a bore. The apparatus also includes a member disposed relative to the bore of the first end of the main body, where the member is adapted to receive and to manipulate the contact tip (e.g., around its longitudinal axis). In one embodiment, the first end of the main body is insertable into a nozzle of the welding device. The apparatus can also include a handle removably attached to the elongated portion of the main body.

In various embodiments, the member includes a clutch bearing. The clutch bearing can install the contact tip in or remove the contact tip from a retaining head of the welding device. The clutch bearing can be a one-way clutch bearing.

In some embodiments, the apparatus includes a cutter. The member can be the cutter, and the cutter can be formed in the bore defined by the first end of the main body. In one embodiment, the cutter can be disposed relative to a bore defined by the second end of the main body. The cutter can be adapted to remove a first contact tip, while the clutch bearing can be adapted to install a second contact tip.

In another aspect, the invention provides a method of manipulating a contact tip of a welding device. The method includes providing a main body including a first end and a second end defining an elongated portion therebetween, where at least the first end defines a bore and includes a member disposed relative to the bore. The method also includes receiving the contact tip in the member, and manipulating the main body to manipulate the contact tip. The manipulating step can include installing or removing the contact tip into/from a retaining head of the welding device.

In yet another aspect, the invention features a method of manufacturing a tool to manipulate a contact tip of a welding device. The method includes forming a main body including a first end and a second end defining an elongated portion therebetween, where at least the first end defines a bore. The method also includes providing a member to receive and to manipulate the contact tip, and positioning the member relative to the bore. The tool can be formed so that the first end of the main body can be insertable into a nozzle of the welding device. The member can include a clutch bearing or a cutter.

In still another embodiment, the invention provides an apparatus for manipulating a contact tip of a welding device. The apparatus includes a first means including a first end and a second end defining an elongated portion therebetween, where at least the first end defines a bore, and a second means for receiving and manipulating the contact tip, where the second means is disposed relative to the bore defined by the first end.

Other aspects and advantages of the invention will become apparent from the following drawings, detailed description, and claims, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

DESCRIPTION OF THE INVENTION

Figure 1:
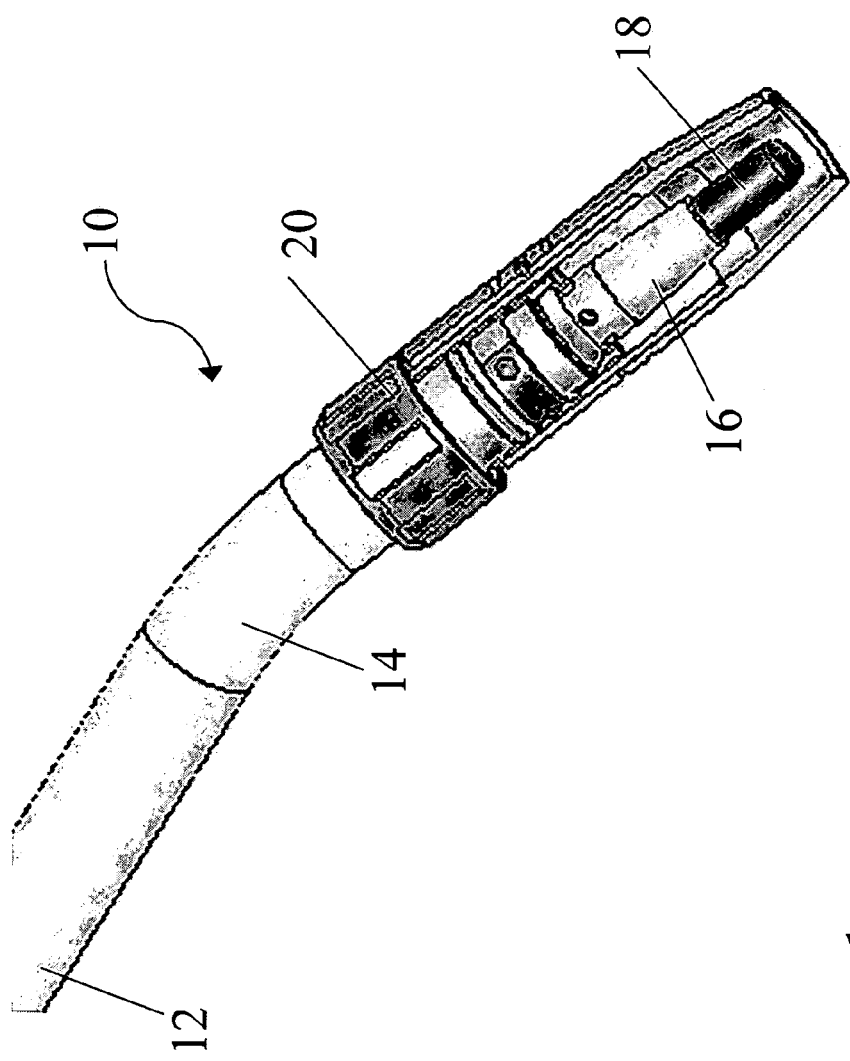
FIG. 1 illustrates a perspective view of an exemplary welding gun.

A welding device can include a plurality of components. For example, a welding gun 10, e.g., as illustrated in FIG. 1, can include a handle 12, a goose neck 14, a retaining head 16, and a contact tip 18. The welding gun 10 can also include a nozzle 20, which is shown in FIG. 1 in cross-section for clarity. The welding gun 10 can be hand-held or suitable for use by a robotic system.

Figure 2:
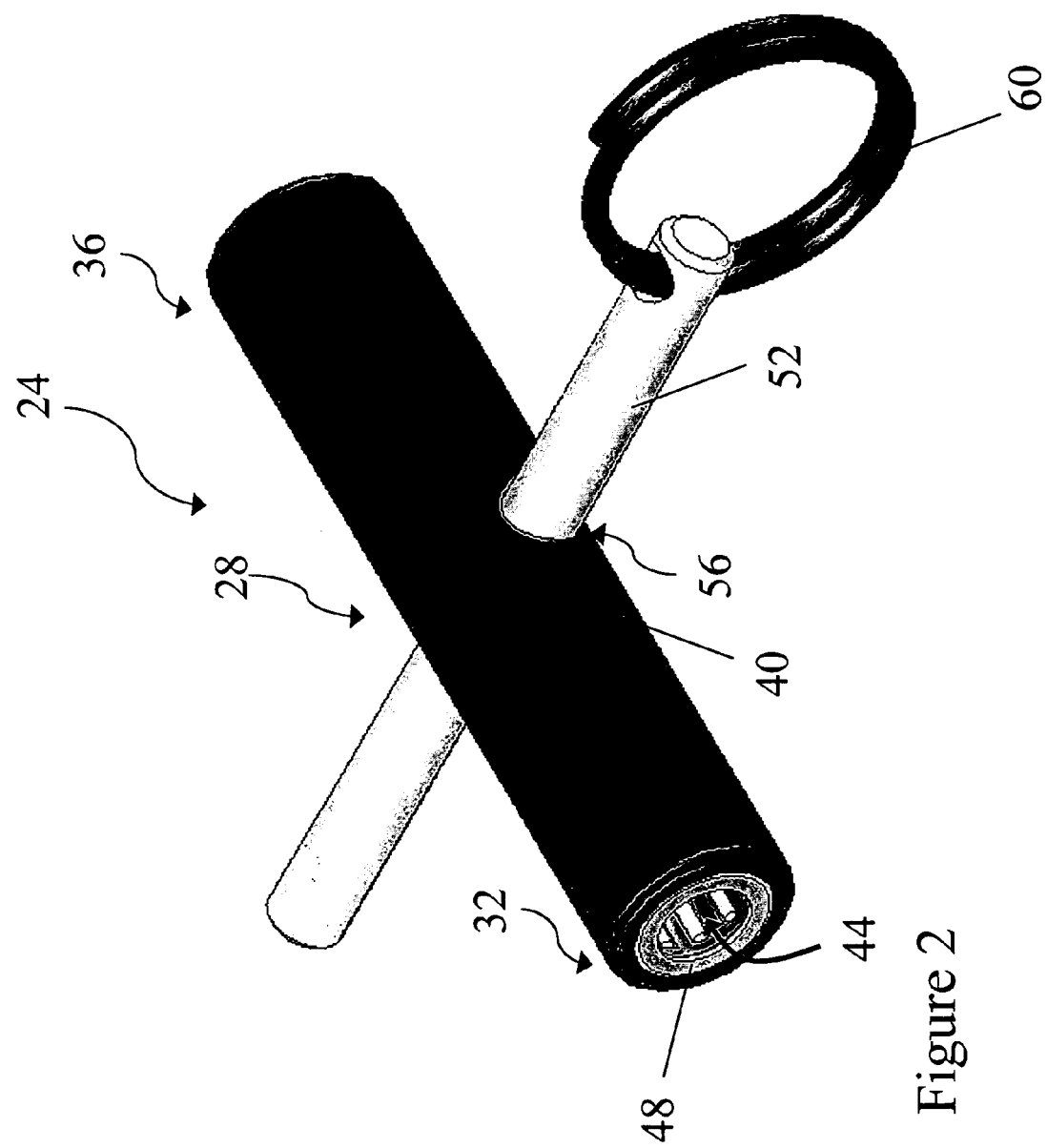
FIG. 2 depicts a perspective view of an exemplary embodiment of an apparatus for manipulating a contact tip of a welding device according to the invention.

FIG. 2 depicts an exemplary embodiment of an apparatus 24 for manipulating a contact tip of a welding device. The apparatus 24 can include a main body 28 having a first end 32 and a second end 36 defining an elongated portion 40 extending therebetween. At least the first end 32 of the apparatus 24 defines a bore 44. The apparatus can include a member 48 disposed relative to the bore 44 of the first end 32. The member 48 is adapted to receive and to manipulate a contact tip (e.g., rotate it around its longitudinal axis). As illustrated in FIG. 2, the apparatus 24 can include a handle 52 disposed through a hole 56 defined by the main body 28. The handle 52 can include a ring 60 attached to an end of the handle 52.

In some embodiments, the apparatus 24 can be used as a contact tip installation tool. For example, the member 48 can receive a contact tip 18, and the apparatus 24 can be used to install a contact tip 18 into a welding device, such as the retaining head 16 of the welding gun 10 illustrated in FIG. 1. Installation can be effected by rotating the contact tip 18 around its longitudinal axis to thread the contact tip 18 into the retaining head 16, or by facilitating other locking engagement connections between the contact tip 18 and a portion of the welding device, such as a pressfit or an interlocking connection.

The apparatus 24 can allow for the contact tip 18 to be installed with sufficient force (e.g., an installation force, a tightening force, an interlocking force, or a torquing force) to ensure a secure connection with the retaining head 16. The sufficient force can be applied using a clutch bearing as the member 48.

The apparatus 24 can also be used as a contact tip removal tool; that is, the apparatus 24 can be used to remove a contact tip 18 from a welding device, e.g., the retaining head 16 of the welding gun 10 of FIG. 1. Removal can be effected by facilitating the breaking of a locking engagement connection between the contact tip 18 and the welding device, for example, by rotating the contact tip 18 around its longitudinal axis to disengage the threads of the contact tip 18 and the retaining head 16.

Figure 3:
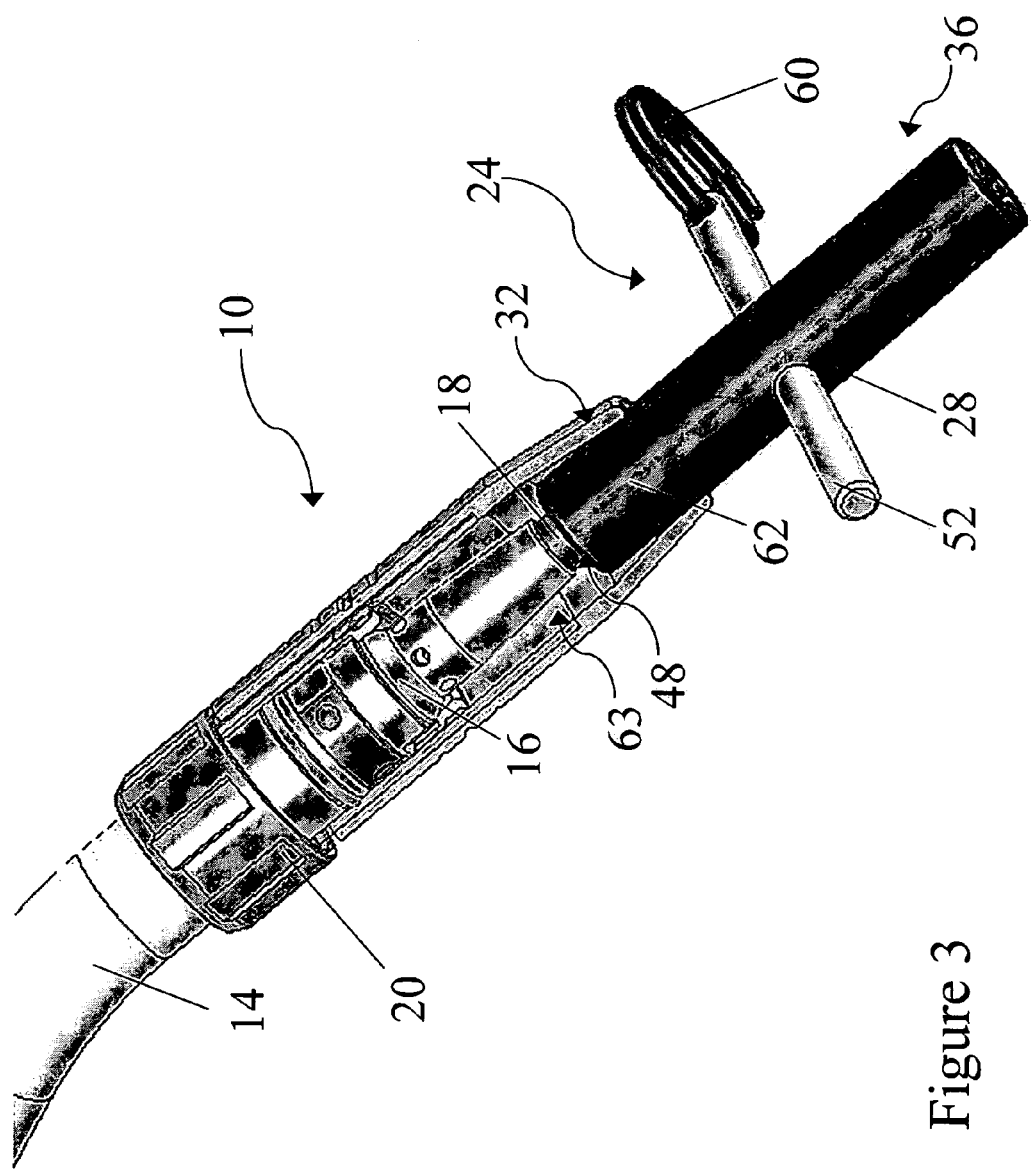
FIG. 3 shows a perspective view of an exemplary apparatus engaging a contact tip according to the invention.

In some embodiments, the apparatus 24 can enable a weld operator to remove a contact tip and replace it with a new contact tip without disassembling the welding device. For example, referring to FIG. 3, the apparatus 24 can be adapted so that the nozzle 20 need not be removed from the welding gun 10 to remove the contact tip 18. The outer diameter 62 of one or both of the ends 32 and 36 can be sized to be insertable into the bore 63 of the nozzle 20, while the member 48 can be sized to receive the contact tip 18. For example, the bore 63 of the nozzle 20 can have an inner diameter of about 5/8" or about 3/4", and the contact tip 18 can have an outer diameter of about 5/16". In this illustrated embodiment, the first end 32 of the apparatus 24 is inserted into the bore 63 of the nozzle 24 so that the member 48 can receive and manipulate the contact tip 18.

In the embodiment illustrated in FIG. 2, the member 48 is a clutch bearing. In various embodiments, the clutch bearing can be a roller clutch bearing or a drawn cup roller clutch bearing. In some embodiments, the clutch bearing can be a one way clutch bearing. In one embodiment, the clutch bearing can include a switch to enable the clutch bearing to install or remove a contact tip 18. The member 48 can take other forms as well though. For example, the member 48 can be a cutter, a blade, a reamer, a clamp, a vise, or other tool for receiving and manipulating a contact tip.

In various embodiments, the member 48 can be either removably or fixably attached to the end 32 or 36 of the apparatus 24. For example, the member 48 can be welded or machined into the bore 44, or the member 48 can be press fit or threaded into the bore 44. In one embodiment, both the first end 32 and the second end 36 can define respective bores, and each bore can include a member for receiving and manipulating a contact tip. In an embodiment having members at both ends 32 and 36, one end can be used for removing a contact tip, and the other end can be used for installing a contact tip.

The apparatus 24 can be manufactured by forming the main body 28 with the first end 32 and the second end 36, where at least the first end 32 defines the bore 44. The member 48 is provided and positioned relative to the bore. As described above, the second end 36 can define a bore and include a member as well. The main body 28 can be formed from a metal or a plastic. In one detailed embodiment, the main body 28 is formed from hardened tool steel. The main body 28 can have a cylindrical shape, as shown, or have a non-circular cross-section.

As described above, the main body 28 can include a through hole 56 into which the handle 52 is insertable or attachable. The handle 52 can be press fitted into the hole 56, or engaged with the main body 28 using other techniques, such as threading. Alternatively, the handle 52 can be formed integrally with the main body 28.

As shown in FIG. 2, the handle 52 can include a ring 60. In various embodiments, the ring 60 can be used for attachment to a belt loop, a key chain, or a portion of a welding device for security. The handle 52 and the ring 60 can be formed from any suitable material, including a metal or a plastic, and can have an exterior finish, e.g., a chrome, anodized, or oxidized finish.

Figure 4:
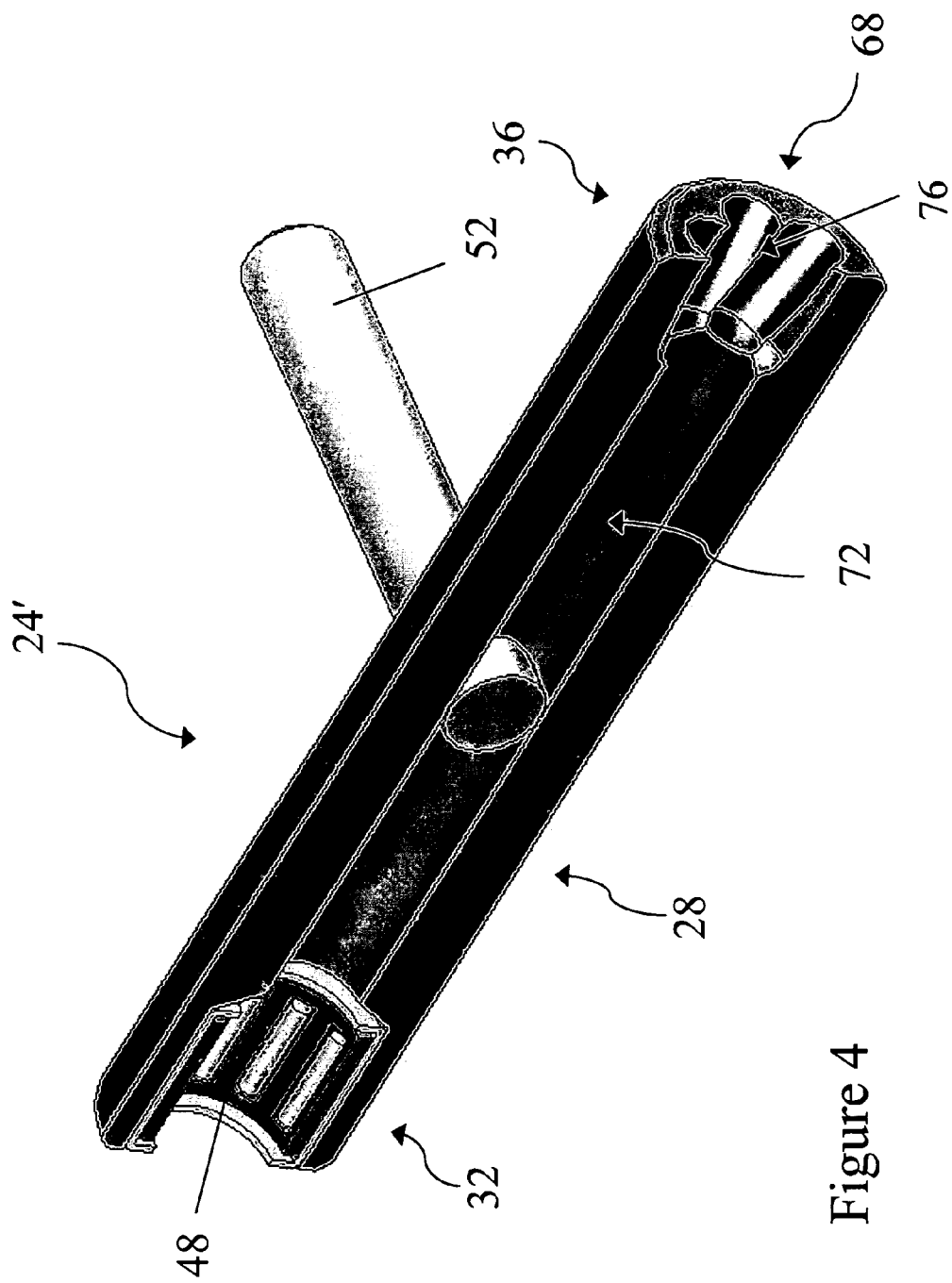
FIG. 4 shows a cross-sectional view of another exemplary embodiment of an apparatus for manipulating a contact tip of a welding device according to the invention.

FIG. 4 shows a cross-section of an illustrative embodiment of an apparatus 24' for manipulating a contact tip of a welding device. The apparatus 24' can include a clutch bearing 64 positioned relative to the first end 32 of the main body 28, and a cutter 68 positioned relative to the second end 32. In this illustrative embodiment, the elongated portion 40 defines a channel 72 between the first end 32 and the second end 36, although a channel is not required. This illustrative embodiment also includes a handle 52 engaged with the main body 28, although this is not required by the invention.

The cutter 68 can be used to remove a contact tip from a welding device, and the clutch bearing 64 can be used to install a contact tip into the welding device. As illustrated, the cutter 68 is formed in the second end 36 of the main body 28. For example, the cutter 68 can include one or more blades 76 formed on an inner surface of the second end 36, and the blade(s) 76 can cut or dig into the contact tip to grip the contact tip. In contrast, the clutch bearing 64 can engage the contact tip without damaging it. Score marks or damage to the contact tip can provide a place for heat to build up or for weld spatter to adhere to the contact tip and potentially clog the nozzle.

Figure 5:
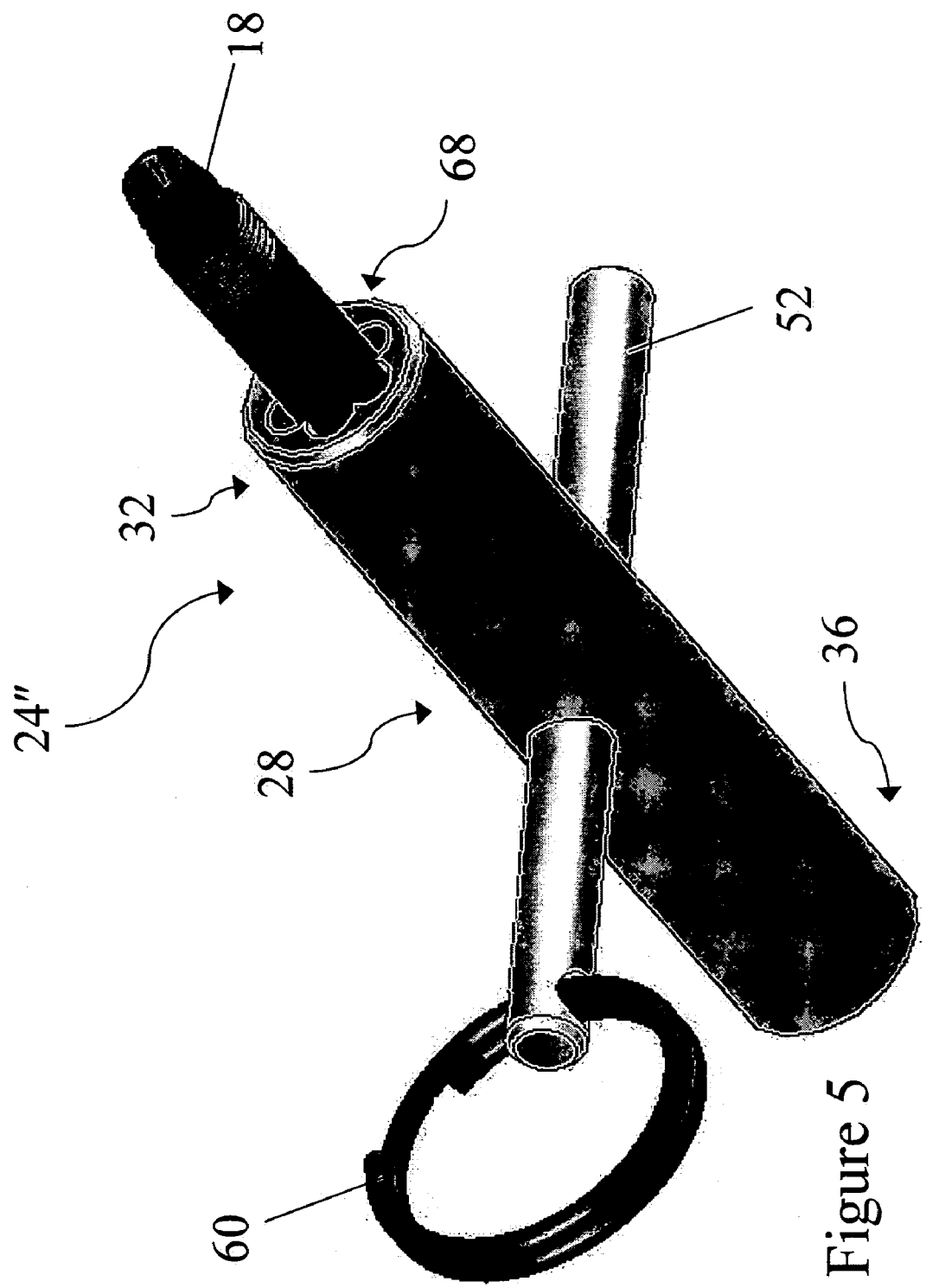
FIG. 5 depicts a perspective view of another embodiment of an apparatus of the invention engaging a contact tip.

FIG. 5 depicts another illustrative embodiment of an apparatus 24'' for manipulating a contact tip of a welding device. In this illustrative embodiment, the first end 32 of the main body 28 includes a cutter 68 that is formed in the bore. The apparatus 24'' is shown engaging a contact tip 18 with the cutter 68. The apparatus 24'' can include a handle 52 and a ring 60. The second end 36 can include a member 48 (not shown) disposed relative to the bore of the second end 36.

While the invention has been particularly shown and described with reference to specific illustrative embodiments, it should be understood that various changes in form and detail may be made without departing from the spirit and scope of the invention as defined by the appended claims.

What is claimed:

1. An apparatus that removes or replaces a contact tip of a welding device, comprising:
    a main body including a first end and a second end defining an elongated portion therebetween, at least the first end defining a bore; and
    a member including a clutch bearing, the member disposed relative to the bore of the first end of the main body and adapted to receive and engage a tubular perimeter of the contact tip to remove or replace the contact tip upon manipulation of the main body.

2. The apparatus of claim 1 wherein the first end of the main body is insertable into a nozzle of the welding device.

3. The apparatus of claim 1 wherein the clutch bearing installs the contact tip in a retaining head of the welding device.

4. The apparatus of claim 1 wherein the clutch bearing removes the contact tip from a retaining head of the welding device.

5. The apparatus of claim 1 wherein the clutch bearing comprises a one-way clutch bearing.

6. The apparatus of claim 1 wherein the member comprises a cutter.

7. The apparatus of claim 1 further comprising a handle removably attached to the elongated portion of the main body.

8. A method of removing or replacing a contact tip of a welding device, comprising:
    providing a main body including a first end and a second end defining an elongated portion therebetween, at least the first end defining a bore and including a member disposed relative to the bore, the member including a clutch bearing to engage a tubular perimeter of the contact tip;
    receiving the contact tip in the member; and
    manipulating the main body to remove or replace the contact tip.

9. The method of claim 8 further comprising inserting the first end of the main body into a bore of a nozzle of the welding device to receive the contact tip.

10. The method of claim 8 wherein the manipulating step comprises installing the contact tip into a retaining head of the welding device.

11. The method of claim 8 wherein the manipulating step comprises removing the contact tip from a retaining head of the welding device.

12. A method of manufacturing a tool to manipulate a contact tip of a welding device, comprising:
    forming a main body including a first end and a second end defining an elongated portion therebetween, at least the first end defining a bore;
    providing a member to receive and engage a tubular perimeter of the contact tip for removing or replacing the contact tip, the member including a clutch bearing; and
    positioning the member relative to the bore.

13. The method of claim 12 further comprising forming the first end of the main body so that it is insertable into a nozzle of the welding device.

14. The method of claim 12 wherein the clutch bearing installs the contact tip in a retaining head of the welding device.

15. The method of claim 12 wherein the clutch bearing removes the contact tip from a retaining head of the welding device.

16. The method of claim 12 wherein the clutch bearing comprises a one-way clutch bearing.

17. The method of claim 12 further comprising attaching a handle to the elongated portion of the main body.

18. An apparatus that removes or replaces a contact tip of a welding device, comprising:
    a first means including a first end and a second end defining an elongated solid portion therebetween, at least the first end defining a bore; and
    a second means that receives the contact tip and that removes or replaces the contact tip, the second means including means in contact with a tubular perimeter of the contact tip to manipulate the contact tip, the second means disposed relative to the bore defined by the first end.

19. An apparatus that removes or replaces a contact tip of a welding device, comprising:
    a main body including a first end and a second end defining an elongated portion therebetween, wherein the first end defines a bore and is insertable into a nozzle of the welding device; and
    a member disposed relative to the bore of the first end of the main body, that receives and removes or replaces the contact tip upon manipulation of the main body.

* * * * *